Figure 1:
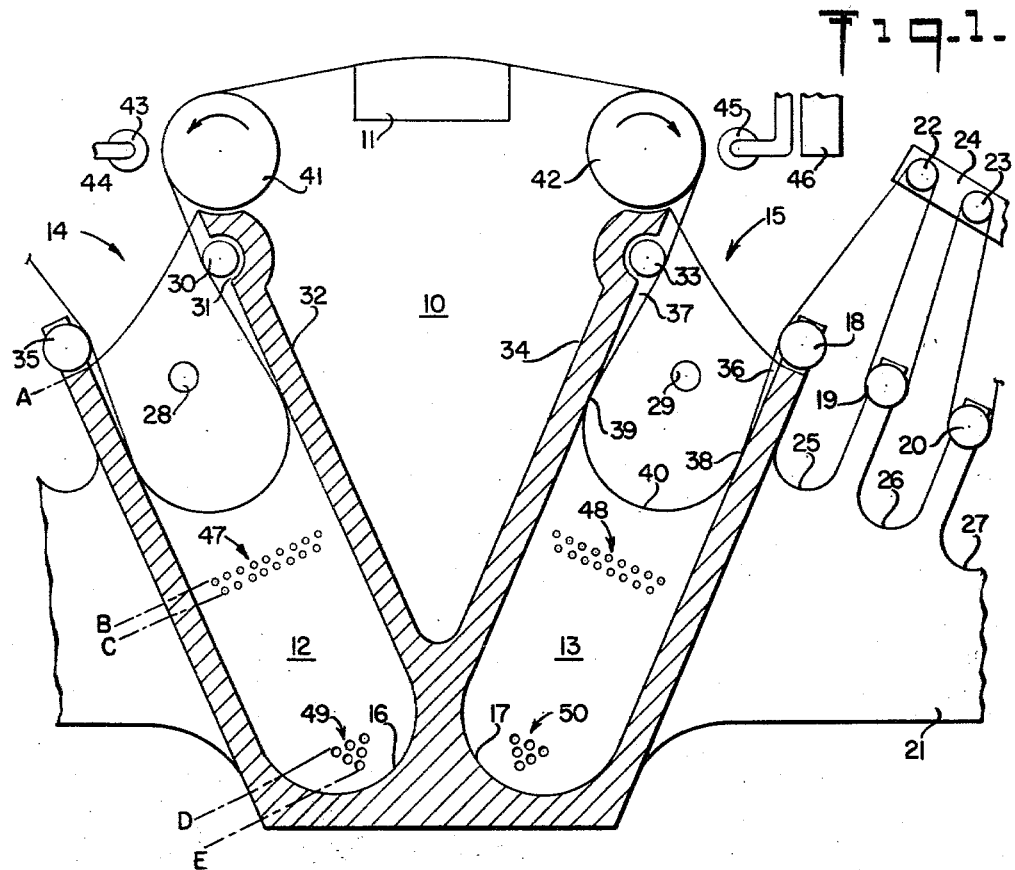

April 6, 1965  R. E. SCHOENEMAN  3,176,893
VACUUM BUFFER TANK
Filed Aug. 20, 1962

INVENTOR.
ROBERT E. SCHOENEMAN
BY
Douglas M. Clarkson
ATTORNEY

United States Patent Office 3,176,893
Patented Apr. 6, 1965

3,176,893
VACUUM BUFFER TANK
Robert E. Schoeneman, Port Washington, N.Y., assignor to Potter Instrument Company, Inc., Plainview, N.Y., a corporation of New York
Filed Aug. 20, 1962, Ser. No. 220,915
5 Claims. (Cl. 226—118)

This invention, generally, relates to high speed electronic data processing apparatus and, more particularly, to a new and improved vacuum tape storage tank for use with such apparatus.

As the programming speeds increased to present day requirements, that is, the high forward-reverse cycling rates that are required in the operation of present day tape handler apparatus, it has become apparent that vacuum storage tanks for tape loops provided poor tension control at these high cycling rates. The vacuum tanks became filled and inoperable at slower forward-reverse cycling rates which provides a further indication that the vacuum buffer is too soft.

"Soft" is a term describing the pressure change versus loop travel, and "buffer" is a term describing a relatively small vacuum tank capable of sufficiently low inertia to permit tape withdrawal at high starting rates without increasing the tension appreciatively. If a buffer is designed so that it requires a maximum loop travel to obtain full pressure change, it is termed "soft." Actually, this condition is the "softest" possible; "hard," on the other hand, denotes a condition where full pressure change occurs in a minimum of loop travel.

Since tension arm movement at fast forward-reverse cycling rates is very rapid, it is likely that arm tension reflected through the tape is fluctuating rapidly also. Probably this tension fluctuates from zero to full arm tension plus maximum inertia.

The distance of travel for a tension arm, however, is very small, and this condition requires a rapidly changing buffer pressure around the balance point, the balance point being that loop position which balances buffer pressure (tape tension) against normal, static arm tension.

A principal object of the present invention is to provide a new and improved vacuum buffer tank to permit accurate balancing of a tape loop even under the severest cycling conditions.

Briefly, an information processing apparatus including a vacuum tape-storage chamber in accordance with the present invention includes at least one, and preferably two, receptacles having a preselected depth and openings to receive a loop of tape. Within a receptacle, a first plurality of vacuum port openings is arranged in a predetermined pattern in one wall and located a predetermined distance within the receptacle from the tape loop opening. A second plurality of vacuum port openings is arranged in a predetermined pattern in one wall of the receptacle at a depth within the receptacle greater than the depth of the first plurality. This arrangement permits a tape loop stored in the receptacle to be subjected to a vacuum pull of two different magnitudes.

Figure 2:
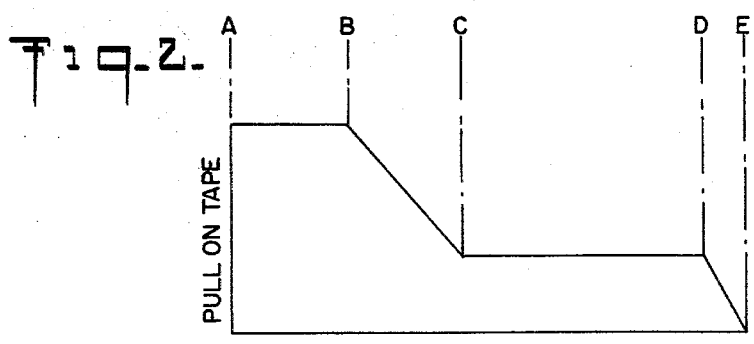

A complete understanding of the invention may be obtained from the following detailed description of an apparatus forming a specific embodiment thereof, when read in conjunction with the appended drawings, in which:

FIG. 1 is a cross sectional view of a portion of a tape handler apparatus showing the principal features of the present invention; and FIG. 2 is a curve illustrating the relative pressure changes within the vacuum tank shown in FIG. 1 as compared with the depth of a tape loop within the tank.

Referring now to FIG. 1 of the drawings, the numeral 10 identifies, generally, a panel for an electronic data processing tape handler, a siutable data processing work station being indicated by the numeral 11. Two vacuum chambers 12 and 13 are positioned on the panel 10 slightly below the working station 11 with their respective tape loop receiving openings 14 and 15 at a flared angle relative to the opposite ends 16 and 17.

To the right as viewed in FIG. 1, three rollers 18, 19 and 20 are supported on a fixed flange 21 to develop loops in a tape between rollers 22 and 23 supported by a moveable tension arm 24 which is pivoted about a point further to the right than is visible in FIG. 1. Portions of the flange 21 are recessed as indicated by the numerals 25, 26 and 27 to permit the tension arm 24 to move the rollers 22 and 23 past the fixed-position rollers 18, 19 and 20 for greater ease in threading a tape. A fixed-position post 28 is located just within the opening 14 of the vacuum buffer tank 12, and a similar post 29 is located just within the opening 15 of the vacuum buffer tank 13. These posts prevent a tape loop from being withdrawn from the tank in the event of a temporary loss of vacuum.

Another fixed-position post 30 is supported in a recessed opening 31 in a wall 32 of the vacuum tank 12, and a fixed-position post 33 is supported similarly relative to a wall 34 of the vacuum tank 13. It may be seen in FIG. 1 that a fixed-position roller 35 is similar to the roller 18, and the two rollers 18 and 35 along with the posts 30 and 33 guide a tape loop into each of the vacuum tanks 12 and 13 at an angle to the inner walls, as indicated for example by the spaces 36 and 37 in the tank 13.

Due to the spaces 36 and 37, there is substantially no pressure differential across the sides of a tape loop. A loop of tape, referring to the tank 13, will make substantially a line contact across the tape width at points 38 and 39 so that a pressure differential will exist only across the tape at the end 40.

A driving capstan 41 is supported adjacent the upper end of the vacuum tank 12 intermediate the tank 12 and the working station 11, and a similar driving capstan 42 is located between the tank 13 and the working station 11. The two driving capstans 41 and 42 are rotated in opposite directions continuously, as indicated by arrows, by a suitable vacuum source such as an electric motor, the capstan 41 being rotated in a counterclockwise direction as viewed in FIG. 1 and the capstan 42 being rotated clockwise.

A pinch roller 43 is supported by a suitable pinch roller assembly 44, a portion of which is visible in FIG. 1, and a pinch roller assembly 46, a portion of which also is visible in FIG. 1. Upon actuation of either pinch rollers 43 or 45, a tape is pinched against a selected driving capstan for driving the tape, as is well known.

To load the apparatus, a tape is threaded easily by first retracting the tension arms, the arm 24 being visible in FIG. 1, into their respective recesses 25, 26, 27, etc., and then opening a cover, not shown, revealing the upper half of the tanks 12 and 13. A tape then is directed easily from, for example, a reel, not visible, on the right as viewed in FIG. 1 in a straight line just under the rollers 19 and 20, under the roller 18, over the post 29, over the capstan 42, under the working station 11, and in a similar manner through the left half of the device. The cover may be replaced, and the tension arms are released to develop the plurality of loops in the tape as shown to the right in FIG. 1.

In accordance with the present invention, a plurality of openings 47 are arranged to provide, collectively, a vacuum port at a point intermediate the extremes of the vacuum buffer tank 12, and a plurality of openings 48 are positioned similarly within the tank 13. The particular number of openings in either plurality 47 or 48 is indicated by the design characteristics for the particular vacuum tank, but it is desired that the vacuum port be characterized in a plurality of openings instead of a single large port as heretofore known. The reason for this is to prevent complete or substantial loss of vacuum to the port holes 48 when the loop has vented all of the holes 47 to atmosphere. These holes impose a resistance to air flow and provide isolation between the ports 47 and 48 as well as between the two halves of the whole buffer.

Using a plurality of holes instead of a single port having the same area as the total area of the holes also permits a wider dispersion of the porting area of the buffer. This wide dispersion provides smoother loop control than a small ported area.

A second plurality of openings 49 is formed in a predetermined pattern in a substantially central position adjacent the lowermost end 16 of the vacuum buffer tank 12, and another plurality of openings 50 is formed in a similar manner adjacent the lowermost end 17 of the tank 13. The reason for the particular structural configuration of the vacuum buffer tanks 12 and 13 as shown in FIG. 1 is understood best by reference to the curve shown in FIG. 2.

The letters A, B, C, D and E are positioned across the curve shown in FIG. 2 to indicate various points along the depth of a tank, and these points are related to the vacuum buffer tank of the invention as shown to the left in FIG. 1 by the same letters.

Referring now to the letters A through E in both FIG. 1 and FIG. 2, the depth of tank as measured by A–B will provide a substantially constant pull on a tape loop since the loop is above the first plurality of openings 47 or 48. As a tape loop passes the first plurality of openings, the distance B–C is transversed, the pull on the tape decreasing substantially linearly until the sides of the tape loop pass all of the openings.

Between the depth of the vacuum tank as measured by the distance C–D, the pull on the tape loop will be substantially constant but at a lower value than between the distance A–B because the pull now will be solely due to the vacuum through the second plurality of openings 49 or 50. The first plurality of openings 47 or 48 at this point will be open to atmosphere, and the vacuum at these openings will be ineffective.

As the end of the tape loop begins to pass openings in the second plurality 49 or 50, the distance D–E will be transversed until at the very bottom of the tank, the pull will be reduced to substantially zero. However, it will be noted that the tape loop must reach substantially the very bottom of the tank, and therefore, a maximum utilization of the tank storage space is obtained.

Referring again to FIG. 1, assuming that $x$ represents tape tension, $y$ represents pressure in the tank at full loop, and $z$ represents pressure in the tank at minimum loop, then the following relationships pertain:

$$y \approx x - ax \quad (1)$$

where "$a$" is a constant in the range 0.1 and 0.3.

$$z \geq 2y \quad (2)$$

The pressure $z$ is selected by choosing a particular, desired vacuum supply, and the pressure $y$ is selected by the area ratio of the two ports. For optimum results, the ratio of the upper port area to the lower port area should be 3:1.

The following claims are intended to define the valid scope of this invention over the prior art and to cover all changes and modifications falling within the true spirit and valid scope of the invention.

What is claimed is:

1. In an information processing apparatus, a vacuum tape-storage chamber comprising,
    a substantially enclosed receptacle having a preselected depth and an opening to receive a loop of tape,
    a first plurality of vacuum port openings arranged in a predetermined pattern in one wall of the receptacle and located a predetermined distance within the receptacle from the tape loop opening in the mid region of the chamber wall, and
    a second plurality of vacuum port openings arranged in a predetermined pattern in one wall of the receptacle and located at a depth within the receptacle greater than the depth of said first plurality in the bottom region of the chamber wall so that the second plurality of vacuum port openings is spaced from said first plurality of vacuum port openings by an imperforate section of said one wall of the vacuum chamber, said one wall being a wall in a plane normal to the transverse dimension of a tape,
    whereby a tape loop stored in said receptacle is subject to a vacuum pull of two different magnitudes.

2. In an information processing apparatus as set forth in claim 1 including a drive capstan-pinch roller mechanism and a working station adjacent one side of the receptacle, and another tape loop storage device adjacent the receptacle on the opposite side thereof from the drive capstan.

3. In an information processing apparatus as set forth in claim 1 including a second receptacle similar to the first-listed receptacle, and the two receptacles being flared apart relative to each other with their tape receiving openings spaced apart on opposite sides of a working station.

4. In an information processing apparatus as set forth in claim 1 including means adjacent said tape receiving opening to direct a tape within the receptacle at an angle to the inner walls so that a tendency to develop friction with the walls is reduced.

5. In an information processing apparatus, including,
    at least two vacuum tape-storage chambers,
    panel means to support said chambers at an angle relative to each other with the uppermost ends thereof flared apart,
    a working station on said supporting means intermediate the flared apart ends of said vacuum chamber,
    tape driving means adjacent each uppermost end of the vacuum chambers at points between the ends and the working station,
    a multiple loop tension arm supported pivotably to develope a plurality of loops in a tape adjacent the upper ends of the vacuum chambers, each of said vacuum tape-storage chambers including,
    a substantially enclosed receptacle having a preselected depth and an opening to receive a loop of tape, said opening being in the uppermost end of the receptacle with the tape driving means and multiple loop tension arms on opposite sides thereof,
    a first plurality of vacuum port openings arranged in a predetermined pattern in one wall of the receptacle and located a predetermined distance within the receptacle from the tape loop opening in the mid region of the chamber wall, and
    a second plurality of vacuum port openings arranged in a predetermined pattern substantially centrally in one wall of the receptacle and located at a depth within the receptacle greater than the depth of said first plurality and adjacent the lowermost end of the receptacle so that the second plurality of vacuum port openings is spaced from said first plurality of vacuum port openings by an imperforate section of said one wall of the vacuum chamber, said one wall being a wall in a plane normal to the transverse dimension of a tape, whereby a tape loop stored in said receptacle is subjected to a vacuum pull of two different magnitudes.

References Cited by the Examiner

UNITED STATES PATENTS

| 3,091,408 | 5/63 | Schoeneman | 242—55.12 |
| 3,106,357 | 10/63 | Kobayashi | 242—55.12 |

FOREIGN PATENTS 847,821  9/60  Great Britain.

ROBERT B. REEVES, *Acting Primary Examiner.*
ANDRES H. NIELSEN, *Examiner.*